United States Patent
White et al.

(10) Patent No.: US 6,991,055 B2
(45) Date of Patent: Jan. 31, 2006

(54) MOTORIZED COVER SYSTEM AND METHOD OF USE THEREOF

(75) Inventors: Tommy E. White, Rochester Hills, MI (US); Adrian B. Chernoff, Royal Oak, MI (US); Christopher E. Borroni-Bird, Oakland Township, MI (US)

(73) Assignee: General Motors Corporation, Detroit, MI (US)

( * ) Notice: Subject to any disclaimer, the term of this patent is extended or adjusted under 35 U.S.C. 154(b) by 166 days.

(21) Appl. No.: 10/611,374

(22) Filed: Jul. 1, 2003

(65) Prior Publication Data

US 2005/0000744 A1   Jan. 6, 2005

(51) Int. Cl.
  *B62D 25/10* (2006.01)
(52) U.S. Cl. .................................. 180/69.2; 180/69.21
(58) Field of Classification Search ............... 180/69.2, 180/69.21, 274, 281; 49/340, 344, 345; 296/117, 296/76, 187.09, 108
See application file for complete search history.

(56) References Cited

U.S. PATENT DOCUMENTS

| | | | |
|---|---|---|---|
| 1,097,455 A * | 5/1914 | Marshall .................... 180/69.2 |
| 2,737,254 A * | 3/1956 | Bayley ..................... 180/69.21 |
| 3,709,316 A | 1/1973 | Glance ......................... 180/69 |
| 3,747,271 A * | 7/1973 | Adamski ...................... 296/76 |
| 4,702,094 A * | 10/1987 | Peterson ..................... 180/289 |
| 4,753,475 A | 6/1988 | Mochida ...................... 296/192 |
| 5,101,921 A | 4/1992 | West et al. ............... 180/69.21 |
| 5,618,069 A | 4/1997 | Konchan et al. ............ 292/216 |
| 6,067,021 A * | 5/2000 | Huber ......................... 296/117 |
| 6,213,235 B1 | 4/2001 | Elhardt et al. ............. 180/69.2 |
| 6,217,108 B1 * | 4/2001 | Sasaki .................... 296/187.09 |
| 6,439,330 B1 * | 8/2002 | Paye ........................ 180/69.21 |
| 6,520,557 B2 | 2/2003 | Benthaus et al. ............. 296/76 |
| 6,568,495 B1 * | 5/2003 | Corder et al. .............. 180/69.2 |
| 6,832,807 B2 * | 12/2004 | Tezuka ........................ 296/128 |
| 2003/0020284 A1 | 1/2003 | Peter .......................... 292/201 |

* cited by examiner

Primary Examiner—Hau Phan
(74) Attorney, Agent, or Firm—Kathryn A. Marra

(57) ABSTRACT

A motorized cover system includes a cover movably connected with respect to a compartment such as a vehicle component, at least one motor vehicle, and at least one linkage operatively connecting the cover to the motor, wherein the motor is operable for moving the cover between a closed position and at least one open position. The motorized cover system may include an automatically engageable and disengageable latch assembly for securing the cover to the vehicle. A method of opening and closing a vehicle compartment cover includes relaying an operator control signal to a motor, powering the motor, and moving the cover between a first position and a second position.

27 Claims, 4 Drawing Sheets

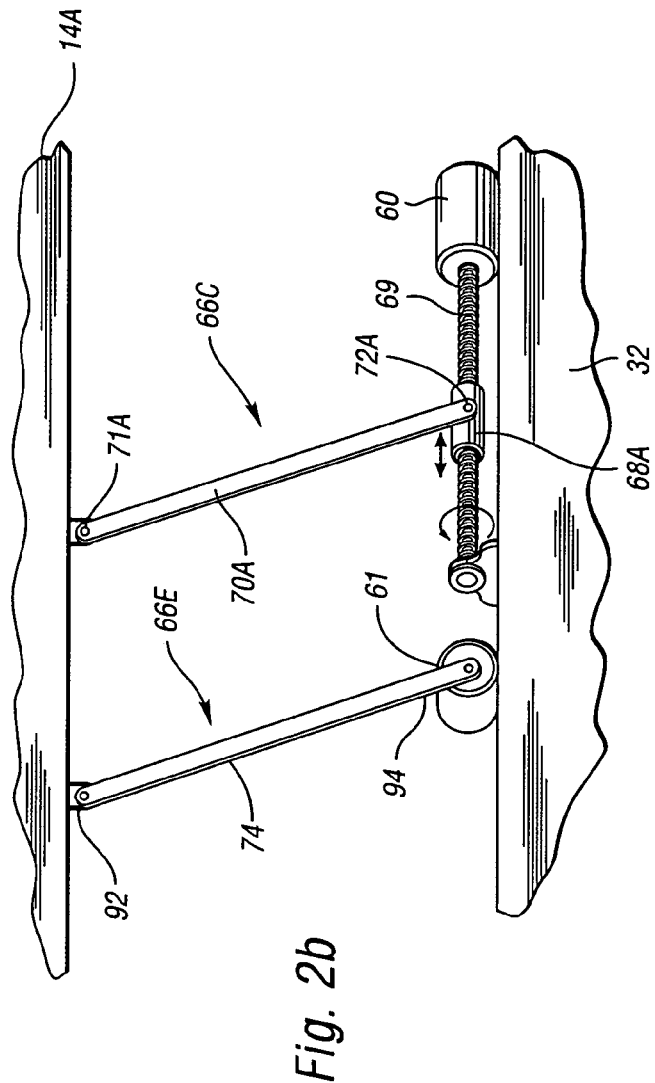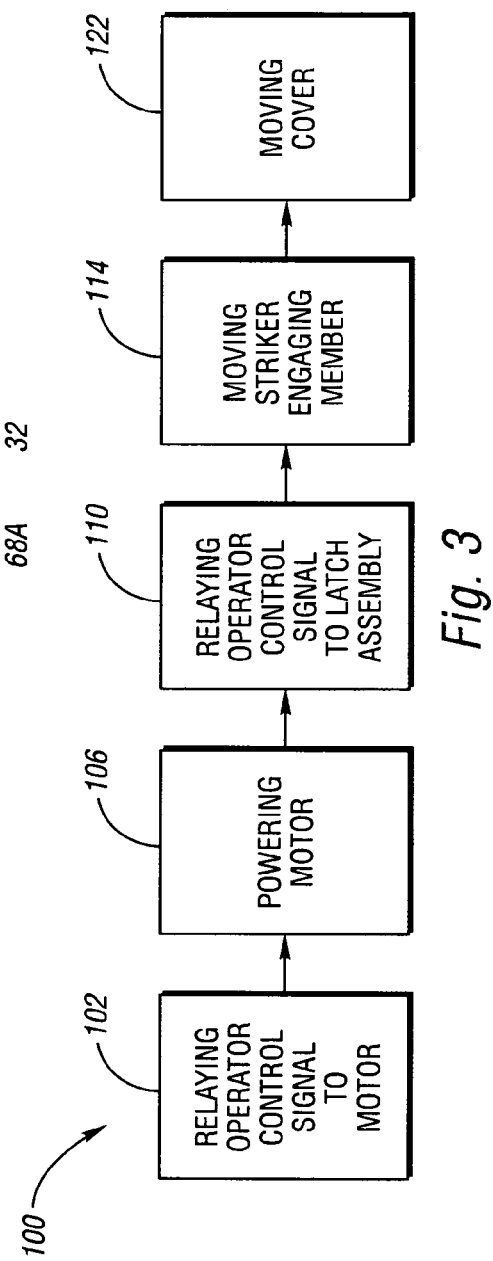

MOTORIZED COVER SYSTEM AND METHOD OF USE THEREOF

TECHNICAL FIELD

The invention relates to a motorized system for opening and closing a cover, specifically a vehicle cover such as a hood.

BACKGROUND OF THE INVENTION

Vehicle covers such as hoods, trunks and other vehicle closures are typically manually openable and closeable. Vehicle covers may be heavy, requiring a fair amount of force to move them. Accordingly, it is advantageous to provide the ability to open and close vehicle covers with less manual exertion.

SUMMARY OF THE INVENTION

A motorized cover system is provided. The motorized cover system may include a cover movably connected with respect to a vehicle for covering a compartment in the vehicle, at least one motor connected to the vehicle and at least one linkage operatively connecting the cover to the motor, wherein the motor is operable for moving the cover between a closed position and at least one open position.

The motorized cover system may include at least one engageable and disengageable latch assembly, disposed between the cover and the vehicle for securing the cover to the vehicle. The latch assembly may be automatically engageable and disengageable.

The linkage may include a first link longitudinally, shiftably driven by the motor and a second link having a first end and a second end, wherein the second link is pivotably connected at the first end of the second link to the cover and at the second end of the second link to the shiftable first link.

The motorized cover system may further include a first linkage and a second linkage. Additionally, the motorized cover system may include a second motor. The second linkage may include a third link. The third link may have a first end and a second end, wherein the third link is pivotally connected at the first end of the third link to the cover and is pivotally driven at the second end of the third link by the second motor.

A method of opening and closing a vehicle cover is provided. The method may include relaying an operator control signal to at least one motor mounted to a vehicle in response to an operator input applied to an operator input device, wherein the operator input device is operatively connected to the motor for stopping and starting the motor, and wherein the motor is operatively connected to a cover for covering a vehicle compartment. The method may also include powering the motor in response to the operator control signal, and moving the cover between a first position and a second position by the powered motor, wherein at least one linkage operatively connects the cover to the motor. One of the first position and the second position would be a closed position in which the cover substantially covers the vehicle compartment and one of the first position and the second position would be an open position in which the cover substantially exposes the vehicle compartment.

The method may further include relaying an operator control signal to at least one latch assembly disposed between the cover and the vehicle for securing the cover to the vehicle. The method may further include moving a striker engagement member of the latch assembly from an engaged position in which the cover is in the closed position and secured to the vehicle to a disengaged position for permitting movement of the cover.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 1b is a fragmentary side schematic illustration of a latch assembly of the motorized cover system of FIG. 1a;

FIG. 1c is a fragmentary schematic illustration in perspective view of a linkage of the motorized cover system of FIG. 1a;

FIG. 1d is a schematic diagram depicting the power flow in the motorized cover system of FIG. 1a;

FIG. 2b is a fragmentary schematic illustration in perspective view of a linkage in the motorized cover system of FIG. 2a; and FIG. 3 is a flow diagram illustrating a method of opening and closing a vehicle compartment cover.

DESCRIPTION OF THE PREFERRED EMBODIMENTS

Figure 1A:
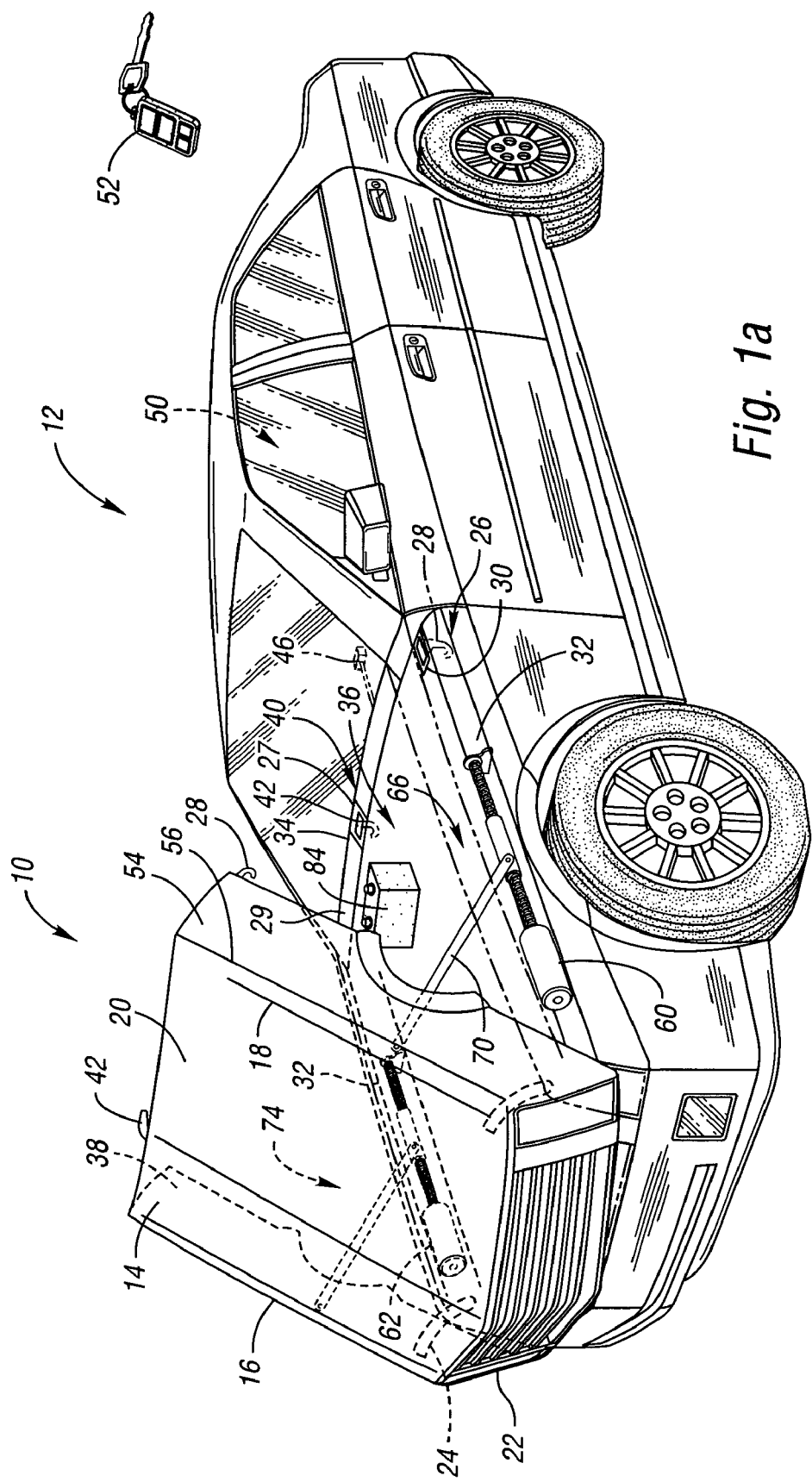
FIG. 1a is a schematic illustration in perspective view of a motorized cover system.

FIG. 1a shows a motorized covered system 10 for a vehicle 12. The motorized cover system 10 includes a cover 14 which, in this embodiment, is a hood. The cover 14 has a first side portion 16, a second side portion 18, a rear portion 20 and a front portion 22. A hingeable connector portion 24 is located at the first side portion 16 towards the front portion 22 for connecting the cover 14 to the vehicle 12.

The motorized cover system 10 includes a first latch assembly 26 located on the left side of the vehicle and a second latch assembly 40 located on a vehicle cowl bar 29, both latch assemblies 26, 40 securing the cover 14 to the vehicle 12 (i.e., "locking down" the cover 14). The first latch assembly 26 includes a first latch striker 28 and first latch housing 30. The first latch housing 30 is mounted to vehicle frame structure 32. The first latch striker 28 is mounted to the cover 14 and is engaged with the first latch housing 30 when the cover 14 is in a first (closed) position, in which both the cover 14 and the first latch striker 28 are shown in phantom. In the first position, the cover 14 covers a vehicle compartment 36. The vehicle compartment 36 may be a power plant compartment such as an engine compartment or a fuel cell compartment. The cover may also be a trunk lid covering a trunk or may be any other type of cover for a compartment. The cover 14 is movable to a second (open) position, shown with solid lines, in which the vehicle compartment 36 is substantially exposed. When the cover 14 is in the second position, the first latch striker 28, also shown with solid lines, is disengaged from the first latch housing 30. A second latch assembly 40 includes the second latch housing 27 and a second latch striker 42. The second latch striker 42 is mounted on the rear portion 20 of the cover 14. When the cover 14 is in the first position, the second latch striker 42, shown in phantom, is engaged with the second latch housing 27. Thus, when the cover 14 is in the first position, it is secured or "locked" to the vehicle 12 by the latch assemblies 26, 40. When the cover 14 is in the second position, the second latch striker 42, shown with solid lines, is disengaged from the second latch housing 27.

Figure 1B:
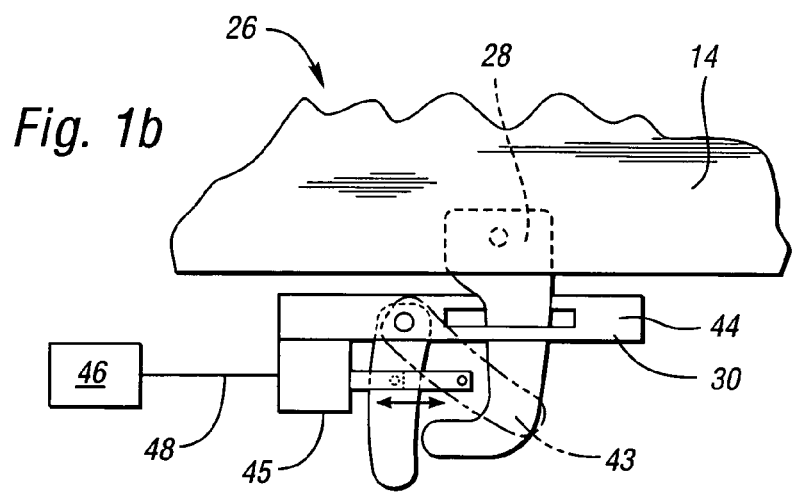

Referring to FIG. 1b, where like reference numbers refer to like components in FIG. 1a, the first latch assembly 26 is shown in more detail. The first latch striker 28 is shown mounted to the cover 14. Such mounting could be by bolting, welding, and a variety of other mounting techniques that will be readily apparent to those skilled in the art. The first latch striker 28 is shown engaged with the first latch housing 30. The first latch housing 30 includes striker engaging member 43, which is pivotably mounted to a latch housing plate 44. Striker engaging member 43 may be a fork bolt lever. A striker engaging member actuator 45 is connected to the striker engaging member 43. An operator input device 46 sends an operator control signal 48 to the striker engaging member actuator 45 for moving the actuator 45 and thereby engaging (shown in phantom) and disengaging (shown in solid) the pivotable fork bolt lever 43 with the first latch striker 28.

Referring again to FIG. 1a, the operator input device 46 is shown located within a passenger compartment 50 on the vehicle 12. The operator input device 46 could be located elsewhere on the vehicle. Additionally, the striker engaging member actuator 45 may be operated manually or remotely with a key fob 52. The invention contemplates alternative locations for the strikers 28, 42. For instance, the cover 14 depicted in FIG. 1a includes a fender portion 54. The invention contemplates other covers that do not include fender portion 54 but, rather, end at the side edge 56 of the cover 14. In that case, the first latch striker 28 may be located on or near the side edge 56. Additionally, the hingeable connector portion 24 may be located at the rear portion 20 or near the center of the first side portion 16 or of the second side portion 18 of the cover 14. In those instances, the strikers 28, 42 would be located in complementary alternative positions.

Other latch assembly configurations and locations are within the scope of the invention. For instance, a motorized cover system may include a latch assembly for which a striker is mounted on the vehicle and a latch housing is mounted to the cover. Additional latch assemblies may be used. For instance, several latch assemblies may be mounted along the cowl bar 29. Multiple latch assemblies may increase the load-bearing integrity of the hood. By establishing more fastening points between the hood and the vehicle, the hood may become a structural, load-bearing member, enabling the front of the vehicle to absorb more energy in the event of an impact.

The motorized cover system 10 includes a left side motor 60, located on the left side of the vehicle 12 and attached to vehicle frame structure 32. A right side motor 62 is shown located on the right side of the vehicle 12 attached to vehicle frame structure 32. The motors 60, 62 may alternatively be attached to other supportive vehicle structure, such as vehicle body panels. A battery 84 for powering the left side motor 60 and the right side motor 62 is shown mounted to the vehicle 12 in vehicle compartment 36.

Figure 1C:
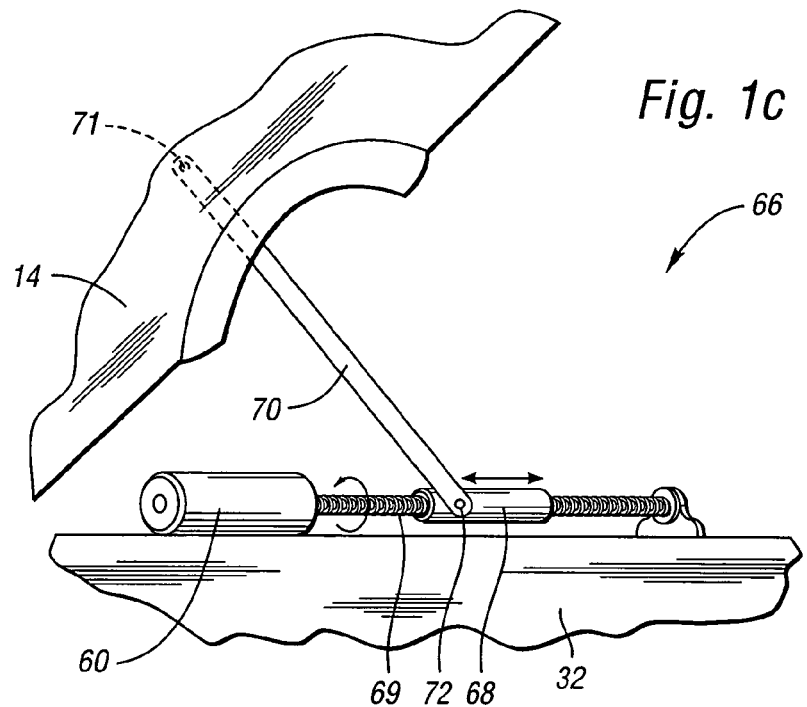

Referring to FIG. 1c, wherein like reference numbers refer to like components in FIGS. 1a and 1b, a first view of the first motor 60, the cover 14 and the left side linkage 66 is depicted. A left side linkage 66 includes a left side first link 68 and a left side second link 70. The left side linkage 66 operatively connects the cover 14 to the left side motor 60. The left side first link 68 is shiftably driven by the motor 60 in a longitudinal direction along a longitudinal axis of the vehicle 12 (i.e., an axis running from the front of the vehicle to the rear of the vehicle).

The left side motor 60 includes an axially rotatable threaded shaft 69. The left side first link 68 is shown as an internally threaded worm gear, configured to complement the threaded shaft 69 such that rotation of the shaft 69 causes the first link 68 to shift along a longitudinal axis of the vehicle, away from or towards the left side motor 60 (as shown by the two-sided arrow), depending on the direction of rotation of the shaft 69.

The second link 70 is shown pivotably connected at a second link first end 71 to the cover 14 and pivotably connected at a second link second end 72 to the shiftable first link 68. One or both of the ends 71, 72 may be configured as simple pivot points. Alternatively, one or both of the ends 71, 72 may be configured as a toothed gear to assist in controlling the orientation of the cover. The longitudinal movement of the first link 68 causes the second link to pivot at the second link second end 72 with respect to the vehicle in lifting the cover 14 when powered by the left side motor 60. The cover 14 is thus lifted from the closed first position to the open second position through the motor-powered left side linkage 66. When the cover 14 is in the first position, the left side first link 68 would be shifted longitudinally by the left side motor 60 towards the passenger compartment 50. When the vehicle cover 14 is in the second position, the left side first link 68 is shifted longitudinally towards the left side motor 60. The second link 70 is depicted as a rigid link. Alternatively, the second link may be a pneumatic, hydraulic or powered piston, in which event it may also function as a shock absorbing device with respect to the cover 14 when the cover 14 is in an open position.

Referring again to FIG. 1a, a right side motor 62 is connected to the vehicle 12 and a right side linkage 74 is pivotably connected to the cover 14 and to the motor 62 in the same manner as shown with respect to the left side linkage 66. Alternatively, a linkage connecting the cover to the vehicle may be a simple hinge.

The cover 14 may be part of a load-bearing body panel assembly as described in U.S. patent application Ser. No. 10/305,379, Load-Bearing Body Panel Assembly for a Motor Vehicle, assigned to General Motors Corp., filed Nov. 26, 2002, which is hereby incorporated by reference in its entirety.

Figure 1D:
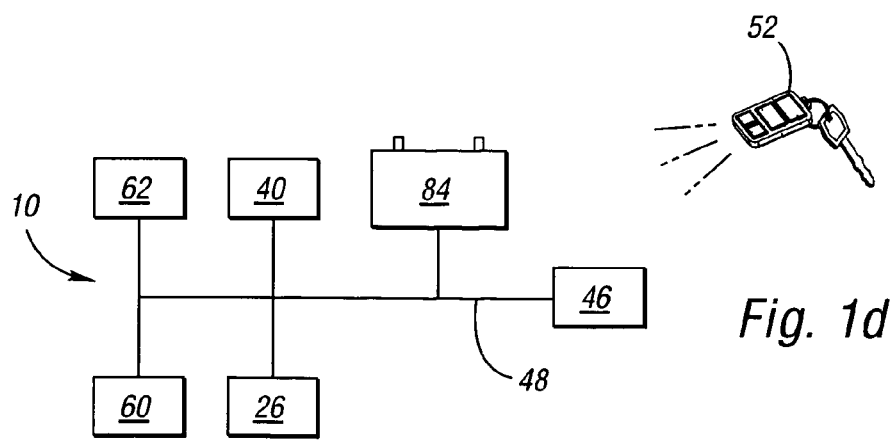

Referring to FIG. 1d, wherein like reference numbers refer to like components in FIGS. 1a–1c, a schematic illustration of the electrical connections in the motorized cover system 10 is shown. Operation of the operator input device 46, e.g., by a vehicle driver manually pressing the input device 46, relays an operator control signal 48 to the left side motor 60, to the right side motor 62, to the first latch assembly 26 and to the second latch assembly 40. The battery 84 is also connected to the motors 60, 62 and the first and second latch assemblies 26, 40. The operator control signal 48 causes battery power to flow to those components. Accordingly, the left side motor 60 and the right side motor 62 are powered in response to the operator control signal 48, moving the linkages 66, 74 as described above. Furthermore, the operator control signal 48 actuates the striker engaging member actuator 45 in the first latch assembly 26 and a like striker engaging member actuator (not shown) in the second latch assembly 40 for moving the pivotable fork bolt lever 43 in the first latch assembly 26 and a similar fork bolt lever in the second latch assembly 40 from a first position to the second position. For example, referring again to FIG. 1b, the pivotable fork bolt lever 43 is movable from a first position shown with solid lines, which is an engaged position, to a second position, shown in phantom, which is a disengaged position, by the striker engaging member actuator 45. The key fob 52 is also operable to cause the operator control signal 48 to be relayed to the motors 60, 62 and to the latch assemblies 26, 40. Accordingly, operation of both the cover 14 and the latch assemblies 26, 40 may be automatic.

The motors may also be actuated by a signal from an impact or proximity sensor located on the vehicle. In that case, the motors may be actuated to move the cover to a second position at which the rear portion of the cover is slightly elevated with respect to the first position (e.g., less than one foot). At such elevation, the cover may comprise an energy absorbing impact device with respect to an impacting object, potentially protecting the object from contacting other portions of the vehicle that are less able to cushion impact.

Figure 2A:
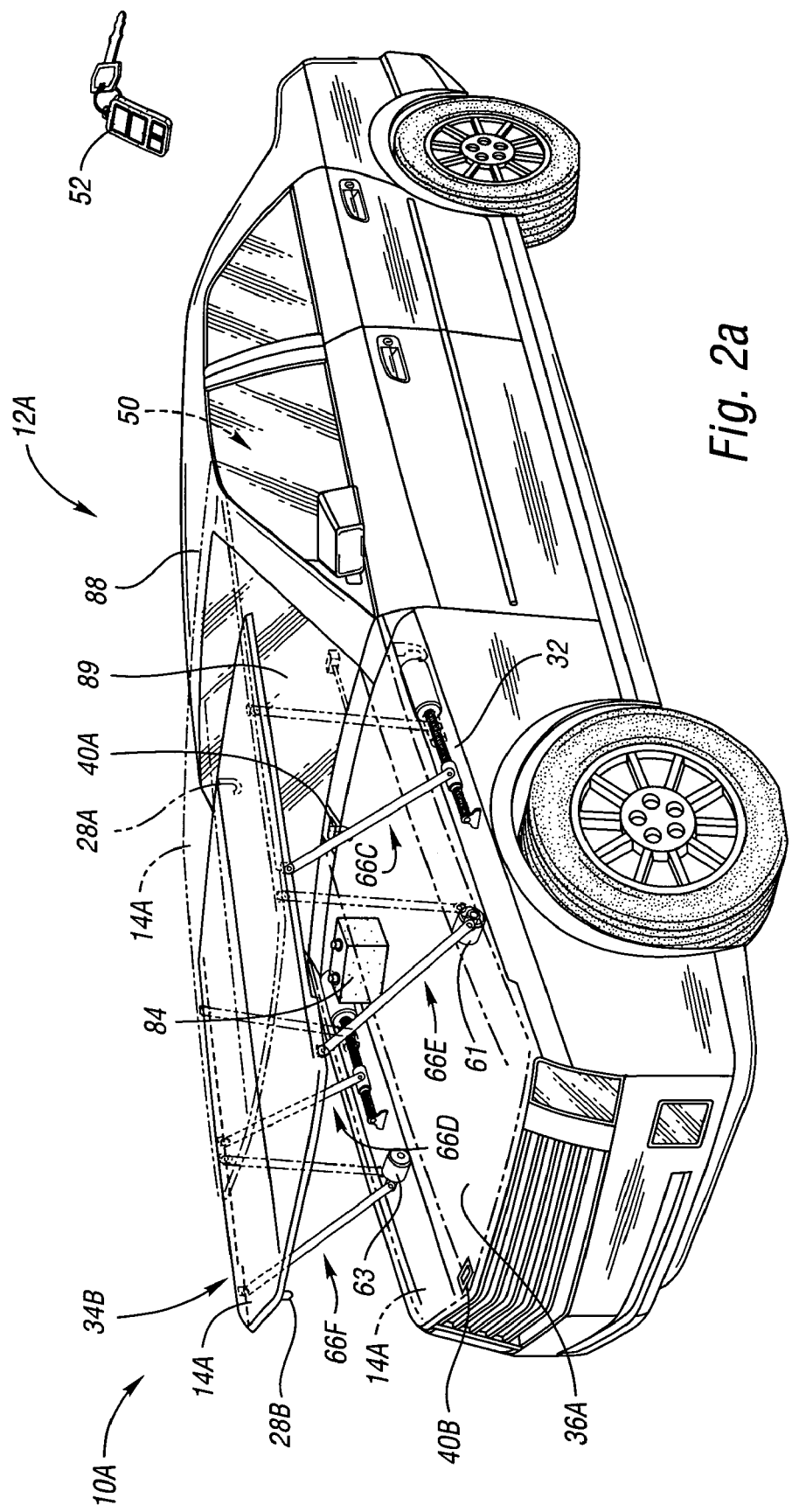
FIG. 2a is a schematic illustration in perspective view of another embodiment of a motorized cover system.

FIG. 2*a*, wherein like reference numbers refer to like components in FIGS. 1*a*–1*d*, shows another embodiment of a motorized cover system 10A including two left side linkages 66C and 66E and two right side linkages 66D and 66F. The linkages 66C–66F move cover 14A from a first closed position shown in phantom to a second position shown with solid lines which is substantially above a vehicle compartment 36A. Linkages 66C–66F then move the cover 14A to a third position shown with phantom lines in which the cover 14A is at least partially over a vehicle front windshield 89. Alternatively, in the third position, the cover may translate to a position at which it is at least partially over a vehicle roof 88. Accordingly, the cover 14A is translated with respect to the vehicle from the first position to the third position. In the first position, the cover 14A closes the vehicle compartment 36A. In the second and third positions, the vehicle compartment 36A is substantially exposed. The invention also contemplates the use of a motorized cover system 10A on a vehicle that does not have a roof. In that case, the cover 14A would be at least partially over the passenger compartment 50 in the third position shown in FIG. 1*a*.

Referring to FIG. 2*b*, wherein like reference numbers refer to like components in FIGS. 1*a*–2*a*, a view of the left side linkages 66C and 66E are shown. Linkage 66C includes a second link 70A that is shown pivotally connected to the cover 14A at a first end 71A. The second link 70A is connected to a first link 68A at a second end 72A and is relatively pivotally movable with respect to the compartment 36 shown in FIG. 2*a*.

Linkage 66E includes a third link 74 that is pivotally connected to the cover 14A at the third link first end 92. A second motor 61 is connected to the vehicle structure 32. The third link 74 is pivotally connected to the motor 61 at a third link second end 94. The motor 61 pivotally drives the third link 74 at the third link second end 94. The first end 71A, second end 72A, third link first end 92, and third link second end 94 may be configured as simple pivot points. Alternatively, one or more of the first end 71A, second end 72A, third link first end 92, and third link second end 94 may be configured as a toothed gear to assist in controlling the orientation of the cover. The motor 61 and the third link 74 are shown mounted inboard with respect to the motor 60 and the linkage 66A so that the linkages 66C, 66E do not physically interfere with each other during opening and closing of the cover 14A.

As with respect to the second link 70 shown in FIG. 1*c*, the second link 70A and the third link 74, both shown in FIG. 2*b* as rigid members, may alternatively be pneumatic or hydraulic pistons, thus providing a shock-absorbing feature with respect to the cover 14A when the cover 14A is in an open position.

Referring again to FIG. 2*a*, the cover 14A has strikers 28A, 28B, similar to first latch striker 28 shown in FIG. 1*a*. Additionally, latch assemblies 40A, 40B are mounted to vehicle 12A similarly to latch assembly 40 shown in FIG. 1*a*. When latch assemblies 40A, 40B release strikers 28A, 28B the cover 14A translates towards the rear of the vehicle 12A shown in FIG. 2*a*. When the motors 60, 61 are run in an opposite direction, the shiftable first link 68A will accordingly move in an opposite direction and the third link 74 will pivot such that the first end of the third link 92 will move toward the front of the vehicle, causing the cover 14A to move towards the front of the vehicle 12A. The cover 14A has no hingeable connector portions for hingeably connecting the cover 14A to the vehicle.

Referring to FIG. 3, a method of opening and closing a vehicle compartment cover 100 is depicted. The method 100 includes relaying an operator control signal 102 to a motor mounted to a vehicle in response to an operator input applied to an operator input device. The operator input device is operatively connected to the motor for stopping and starting the motor and the motor is operatively connected to the cover for covering the vehicle compartment.

The method 100 includes powering a motor 106 in response to the operator control signal. The method further includes relaying the operator control signal to a latch assembly 110. The latch assembly includes a striker engaging member and is disposed between the cover and the vehicle. The operator input device is operatively connected to the striker engaging member. Such a latch assembly 26 is depicted in FIGS. 1*a*–1*b*. Relaying on operator control signal 102 and powering a motor 106 in response to the operator control signal are carried out by the motorized cover systems depicted in FIGS. 1*a* and 2*a* and discussed herein.

The method 100 further includes moving the striker engaging member 114 from a first position to a second position in response to the operator control signal. One of the first and second positions is an engaged position and one of the first and second positions is a disengaged position. Such movement is discussed above with respect to FIG. 1*b* wherein the operator input device 46 sends operator control signal 48 to the striker engaging member actuator 45 for moving the actuator 45 and thereby engaging and disengaging the pivotable fork bolt lever 43 from the first latch striker 28.

The method further includes moving the cover between a first position and a second position 122 by the powered motor and by at least one linkage operatively connecting the cover to the motor. One of the first position and the second position is an open position in which the cover substantially exposes the vehicle compartment. The other of the first position and the second position is a closed position in which the cover substantially covers the vehicle compartment. The vehicle compartment may be a power plant compartment. The cover may be a hood. Moving the cover between a first position and a second position 118 is depicted in FIG. 1*a* and in FIG. 2*a* and discussed with respect thereto.

The linkage operatively connecting the cover to the motor may be a linkage such as shown in FIGS. 1*a*–1*b* and described with respect thereto. Alternatively, the linkage operatively connecting the cover to the motor may be a linkage such as shown in FIGS. 2*a*–2*b* and described with respect thereto. Moving the cover 122 may include hingeable movement, such as when the linkage is as shown in FIGS. 1*a*–1*b* and described with respect thereto. Moving the cover 122 may include translatable movement of the cover with respect to the vehicle. Such movement would occur when the linkage is as shown in FIGS. 2a–2b and described with respect thereto. Moving the cover 122 may occur on a vehicle that has a windshield wherein substantially all of the cover is above the compartment and is at least partially over the windshield when the cover is in the first or second position that is an open position. Such a vehicle and moving the cover 122 with respect thereto is depicted in FIG. 2a and described herein with respect thereto.

While the best modes for carrying out the invention have been described in detail, those familiar with the art to which this invention relates will recognize various alternative designs and embodiments for practicing the invention within the scope of the appended claims.

What is claimed is:

1. A motorized cover system for a vehicle comprising:
   a cover movably connected with respect to the vehicle for covering a compartment in the vehicle;
   at least one motor connected to the vehicle; and
   at least one linkage operatively connecting the cover to the motor, wherein said at least one linkage includes a first link longitudinally, shiftably driven by said at least one motor and a second link having a first end and a second end, wherein the second link is pivotally connected at the first end of the second link to the cover and at the second end of the second link is pivotally connected to the shiftable first link, and wherein said at least one motor is operable for moving the cover between a closed position and at least one open position.

2. The motorized cover system of claim 1, wherein the compartment is a power plant compartment, the cover is a hood and the compartment is substantially covered in the closed position and is substantially exposed in said at least one open position.

3. The motorized cover system of claim 1, further comprising at least one latch assembly disposed between the vehicle and the cover for securing the cover to the vehicle, wherein said at least one latch assembly is engageable for securing the cover to the vehicle in the closed position and disengageable for permitting movement of the cover.

4. The motorized cover system of claim 3, wherein said at least one latch assembly is automatically engageable and automatically disengageable.

5. The motorized cover system of claim 3, wherein said at least one latch assembly includes a striker and wherein said striker is engaged when the cover is in the closed position and disengaged when the cover is in said at least one open position.

6. The motorized cover system of claim 5, wherein the striker is disposed on the cover.

7. The motorized cover system of claim 1, further comprising an operator input device, wherein the operator input device is operatively connected to the motor for operating the motor.

8. The motorized cover system of claim 7, wherein the operator input device is operatively connected to said at least one latch assembly for engaging and disengaging said at least one latch.

9. The motorized cover system of claim 1, further comprising at least one hingeable connecter portion hingeably connecting the cover with respect to the vehicle.

10. The motorized cover system of claim 1, wherein the first link is a worm gear.

11. The motorized cover system of claim 1, wherein said at least one motor includes a first motor and a second motor, wherein said second motor is operatively connected to the vehicle;
   wherein said at least one linkage includes a first linkage and a second linkage;
   wherein said second linkage includes a third link having a first end and a second end, wherein said third link is pivotally connected at the first end of the third link to the cover and wherein said third link is pivotally driven at the second end of the third link by the second motor.

12. The motorized cover system of claim 11, wherein the cover is characterized by a lack of hingeable connecter portions hingeably connecting the cover with respect to the vehicle.

13. The motorized cover system of claim 11, wherein the vehicle has a roof and wherein the cover is at least partially over the roof in said at least one open position.

14. The motorized cover system of claim 11, wherein the vehicle has a passenger compartment and wherein the cover is at least partially over the passenger compartment in said at least one open position.

15. The motorized cover system of claim 11, wherein the vehicle has a windshield and wherein the cover is at least partially over the windshield in said at least one open position.

16. The motorized cover system of claim 1, further comprising at least one hingeable connector portion hingeably connecting the cover with respect to the vehicle.

17. The motorized cover system of claim 1, wherein the cover is a hood and the compartment is an engine compartment, and wherein the vehicle has a vehicle frame, the vehicle frame comprising:
   a plurality of structural load-bearing frame members including
   two front hinge pillars,
   at least one cross member mounted with respect to the two front hinge pillars and partially defining the engine compartment, and
   two rails mounted with respect to the at least one cross member and further partially defining the engine compartment; and
   a body panel assembly;
   wherein the body panel assembly includes the hood; and
   wherein the body panel assembly is rigidly mounted to each of at least two of the frame members so that the body panel assembly forms a portion of the frame by structurally interconnecting said at least two frame members.

18. A motorized cover system comprising:
   a cover, wherein the cover is connectable with respect to a compartment;
   at least one motor; and
   at least one linkage operatively connectable to the cover and to said at least one motor, wherein said at least one motor is operable for moving the cover between a closed position and at least one open position such that the compartment is substantially covered when the cover is in the closed position and is substantially exposed when the cover is in said at least one open position;
   wherein said at least one linkage has a first link longitudinally, shiftably drivable by said at least one motor and a second link having a first end and a second end, wherein said second link is pivotally connectable at the first end of the second link to the cover and at the second end of the second link is pivotally connectable to the shiftable first link.

19. The motorized cover system of claim 18, wherein the cover is a hood and the compartment is a power plant compartment.

20. The motorized cover system of claim 18, wherein said at least one motor includes a first motor and a second motor;
wherein said at least one linkage includes a first linkage and a second linkage;
wherein said second linkage includes a third link having a first end and a second end, wherein said third link is pivotally connectable at the first end of the third link to the cover, and wherein said third link is pivotally drivable at the second end of the third link by the second motor.

21. The motorized cover system of claim 18, further comprising at least one latch assembly disposable between the cover and the compartment for securing the cover over the compartment, wherein said at least one latch assembly is engageable to secure the cover over the compartment and disengageable for permitting movement of the cover.

22. A method of opening and closing a vehicle compartment cover, the method comprising:
relaying an operator control signal to at least one motor mounted to a vehicle in response to an operator input applied to an operator input device, wherein the operator input device is operatively connected to said at least one motor for stopping and starting said at least one motor, and wherein said at least one motor is operatively connected to a cover for covering a vehicle compartment;
powering said at least one motor in response to the operator control signal; and
moving the cover between a first position and a second position by the powered motor wherein at least one linkage operatively connects the cover to said at least one motor, wherein said at least one linkage includes a first link longitudinally, shiftably driven by the motor and a second link having a second link first end and a second link second end, wherein said second link is pivotally connected at said second link first end to the cover and at said second link second end is pivotally connected to the shiftable first link;
wherein one of said first position and said second position is a closed position in which the cover substantially covers the vehicle compartment and one of said first position and said second position is an open position in which the cover substantially exposes the vehicle compartment.

23. The method of claim 22, wherein the vehicle compartment is a power plant compartment and the cover is a hood.

24. The method of claim 22, further comprising:
relaying said operator control signal to at least one latch assembly, wherein said at least one latch assembly includes a striker engaging member, wherein said at least one latch assembly is disposed between the cover and the vehicle for securing the cover to the vehicle, and wherein the operator input device is operatively connected to said at least one striker engaging member; and
moving said striker engaging member from a first position to a second position in response to the operator control signal, wherein at least one of said first and second positions is an engaged position in which the cover is in the closed position and secured to the vehicle and at least one of said first and second positions is a disengaged position in which the cover is moveable.

25. The method of claim 22, wherein said at least one motor includes a first motor and a second motor, wherein said second motor is operatively connected to the vehicle, wherein said at least one linkage includes a first linkage and a second linkage;
wherein said second linkage includes a third link having a first end and a second end, wherein said third link is pivotally connected at the first end of the third link to the cover and wherein said third link is pivotally driven at the second end of the third link by the second motor.

26. The method of claim 25, wherein moving the cover includes translatable movement of the cover with respect to the vehicle.

27. The method of claim 25, wherein the vehicle has a windshield and wherein substantially all of the cover is above the compartment and is at least partially over the roof windshield the cover is in said at least one of said first and said second positions that is an open position.

* * * * *